Patented Jan. 11, 1927.

1,614,037

UNITED STATES PATENT OFFICE.

RALPH H. McKEE, OF NEW YORK, N. Y.

METHOD OF MAKING ORGANIC PEROXIDES.

No Drawing. Application filed October 5, 1923. Serial No. 666,853.

This invention relates to methods of making organic peroxides, and more particularly to the manufacture of the peroxides of organic acids, such as benzoyl peroxide, phthalyl peroxide, and fumaryl peroxide.

Heretofore, the acid chloride, such as benzoyl chloride has been treated with a 10 per cent sodium peroxide solution or its equivalent, such as a mixture of hydrogen peroxide and sodium peroxide. In some instances, the acid chloride has been treated with a mixed 10 per cent solution of sodium acetate and sodium peroxide.

In practicing the process according to the usual methods, a decidedly alkaline solution is obtained and as a result, the yields are very low. The usual yield of phthalyl peroxide is about 15 per cent of the theoretical amount. This is largely due to the fact that the alkaline solution decomposes the peroxide as it is formed.

I have found that if the solution of the peroxide with which the acid chlorid is treated contains a material which will keep the neutrality at a pH of about 7.5, the yield of most organic peroxides will be materially increased and the material obtained will be of a satisfactory character, however, for certain organic acid peroxides a more alkaline solution is preferable. While various materials may be employed as buffers to keep the acidity of the solution at a desired point, I have found sodium bicarbonate to be good and di-sodium phosphate to be particularly adapted for this purpose. For a change of 90 per cent of the di-sodium phosphate employed to mono-sodium phosphate, the pH of the solution changes only from 8 to 6. Other materials such as ordinary borax may be employed for the purpose, but of the readily obtained materials I prefer sodium bicarbonate and di-sodium phosphate.

In practicing the process, commercial hydrogen peroxide of about 25 per cent strength is first diluted to about 5 per cent strength i. e., the so diluted solution will contain 95 per cent water and 5 per cent $H_2O_2$, and di-sodium phosphate added thereto in an amount that when the acid chlorid, say phthalyl chlorid, reacts with it, about 90 per cent of the di-sodium phosphate will be changed to mono-sodium phosphate. Some efficient stirring means should be employed during the addition of the phthalyl chlorid. Instead of stirring, the phthalyl chlorid may be sprayed into the reacting liquor, or both stirring and spraying may be used simultaneously. The optimal temperature employed in the manufacture of most acid peroxides is from 40 to 65° F. The peroxides separate as precipitates slightly soluble in water and are filtered off, washed, preferably as free as possible from the water soluble constituents, and dried at low temperatures. In manufacturing fumaryl peroxide a temperature of from 30 to 40° F. is preferably employed.

In the washing operation, it is advantageous to first employ water containing a small percentage of acid, say one-tenth of 1 per cent and then wash with pure water. This permits quicker washing and also produces a more stable product.

In a modified form of the process, a less amount of di-sodium phosphate or other buffer is placed in the solution and the first half of the operation carried out as above indicated. When the operation is half through, caustic soda or soda ash is added in an amount sufficient to change back the mono-sodium phosphate which has been formed into di-sodium phosphate. This form of the process is cheaper in that a smaller amount of di-sodium phosphate is necessary. As a further modification, the caustic soda or soda ash may be added slowly during the reaction to take care of the hydrochloric acid as formed, and thereby permit the use of a smaller amount of the di-sodium phosphate or other buffer.

As stated, I have found that the use of a buffer, that is, a material which will keep the acidity of the solution at or near a particular point, in the manufacture of organic peroxides, and particularly in the manufacture of peroxides of organic acids will materially increase the yield and give a product of high quality.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claims.

I claim:

1. The method of making organic peroxides which comprises treating an organic acid chlorid with a hydrogen peroxide solution containing a material that will maintain the hydrogen ion concentration at a pH of approximately 7.5.

2. The method of making organic peroxides which comprises treating an organic acid chlorid with a hydrogen peroxide solution containing a material that will maintain the pH of the solution between 6 and 8.

3. The method of making peroxides of organic acids which comprises treating an organic acid chlorid with a solution of hydrogen peroxide containing a material that will maintain the hydrogen ion concentration at a pH of approximately 7.5.

4. The method of making peroxides of organic acids which comprises treating an organic acid chlorid with a solution of hydrogen peroxide containing a material that will maintain the pH of the solution between 6 and 8.

5. The method of making organic peroxides which comprises adding an organic acid chlorid to a solution of hydrogen peroxide and di-sodium phosphate.

6. The method of making organic peroxides which comprises adding an organic acid chlorid to a solution of hydrogen peroxide and di-sodium phosphate, maintaining the temperature between 30° and 65° F., removing the organic peroxide formed, and washing it.

7. The method of making phthalyl peroxide which comprises treating phthalyl chlorid with a hydrogen peroxide solution containing a material that will maintain the hydrogen ion concentration at a pH of approximately 7.5.

8. The method of making phthalyl peroxide which comprises adding phthalyl chlorid to a solution of hydrogen peroxide and di-sodium phosphate.

9. The method of making phthalyl peroxide which comprises adding phthalyl chlorid to a solution of hydrogen peroxide and di-sodium phosphate, maintaining the temperature between 30° and 65° F., removing the phthalyl peroxide formed, and washing it.

10. The method of making organic peroxides which comprises treating an organic acid chlorid with a hydrogen peroxide solution containing a material that will maintain the hydrogen ion concentration of the solution near neutrality.

11. The method of making phthalyl peroxide which comprises treating phthalyl chlorid with a hydrogen peroxide solution containing a material that will maintain the hydrogen ion concentration near neutrality.

12. The method of making organic peroxides which comprises the gradual addition of acid chlorides to a buffered solution of hydrogen peroxide, maintaining a temperature approaching 40° F., a pH value of about 7.5 and efficient stirring.

In testimony whereof, I affix my signature.

RALPH H. McKEE.